(12) United States Patent
Smerczak et al.

(10) Patent No.: US 11,942,829 B2
(45) Date of Patent: Mar. 26, 2024

(54) BONDED ROTOR PLATE

(71) Applicant: BorgWarner Inc., Auburn Hills, MI (US)

(72) Inventors: John R. Smerczak, Ortonville, MI (US); Jay A. Steele, Grand Blanc, MI (US); Anthony J. Mattord, Macomb Township, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 17/873,836

(22) Filed: Jul. 26, 2022

(65) Prior Publication Data

US 2024/0039352 A1    Feb. 1, 2024

(51) Int. Cl.
*H02K 1/30* (2006.01)
*H02K 15/03* (2006.01)

(52) U.S. Cl.
CPC ............. *H02K 1/30* (2013.01); *H02K 15/03* (2013.01); *Y10T 29/53143* (2015.01)

(58) Field of Classification Search
CPC ......... Y10T 29/49009; Y10T 29/49012; Y10T 29/53143; H02K 5/08; H02K 1/30; H02K 1/146; H02K 1/182; H02K 7/18; H02K 21/24
USPC ............... 29/732, 596, 598, 729, 734, 738
See application file for complete search history.

(56) References Cited

U.S. PATENT DOCUMENTS

| | | | |
|---|---|---|---|
| 4,074,159 A * | 2/1978 | Robison | H02K 23/04 310/154.25 |
| 8,896,177 B2 | 11/2014 | Kim | |
| 9,391,500 B2 | 7/2016 | Smith et al. | |
| 9,847,682 B2 * | 12/2017 | Takahashi | H02K 1/28 |
| 10,291,091 B2 | 5/2019 | Moritz et al. | |
| 2011/0241460 A1 | 10/2011 | Mebarki et al. | |
| 2015/0008779 A1 * | 1/2015 | Shi | H02K 3/48 29/598 |
| 2015/0315939 A1 * | 11/2015 | Showalter | F01L 1/352 29/893.2 |
| 2017/0324284 A1 * | 11/2017 | Andrieux | H02K 3/522 |

FOREIGN PATENT DOCUMENTS

| | | |
|---|---|---|
| DE | 102008027758 B4 | 9/2010 |
| JP | 3842196 B2 | 11/2006 |
| WO | WO2021225902 A1 | 11/2021 |

* cited by examiner

Primary Examiner — Thiem D Phan
(74) Attorney, Agent, or Firm — REISING ETHINGTON P.C.

(57) ABSTRACT

A rotor assembly used in an electric motor, includes a rotor having an inner diameter, an outer diameter, and a plurality of rotor slots; a plurality of permanent magnets received within the rotor slots; and a rotor plate having an inner diameter, an outer diameter, and an outer lip extending away from a radial face of the rotor plate toward the rotor, wherein an adhesive bonds the rotor plate to a radial face of the rotor.

10 Claims, 2 Drawing Sheets

BONDED ROTOR PLATE

TECHNICAL FIELD

The present application relates to electric motors and, more particularly, to rotors used in electric motors.

BACKGROUND

Electric motors are increasingly used to control and power a wide array of devices that are deployed in varying environments. As the use of electric motors proliferates, the durability and efficiency of electric motor components can be improved SUMMARY In one implementation, a rotor assembly used in an electric motor, includes a rotor having an inner diameter, an outer diameter, and a plurality of rotor slots; a plurality of permanent magnets received within the rotor slots; and a rotor plate having an inner diameter, an outer diameter, and an outer lip extending away from a radial face of the rotor plate toward the rotor; an adhesive bonds the rotor plate to a radial face of the rotor.

In another implementation, a method of assembling a rotor assembly, includes orienting a rotor plate on a side so that rotor pads and an outer lip face of the rotor plate upwards; placing a rotor on top of the rotor pads so that a radial face of the rotor contacts the rotor pads; and applying an adhesive to an opposite radial face of the rotor so that the adhesive flows through rotor slots of the rotor toward the rotor plate yet is contained by the outer lip thereby bonding the rotor plate to the rotor.

DETAILED DESCRIPTION

Figure 1:
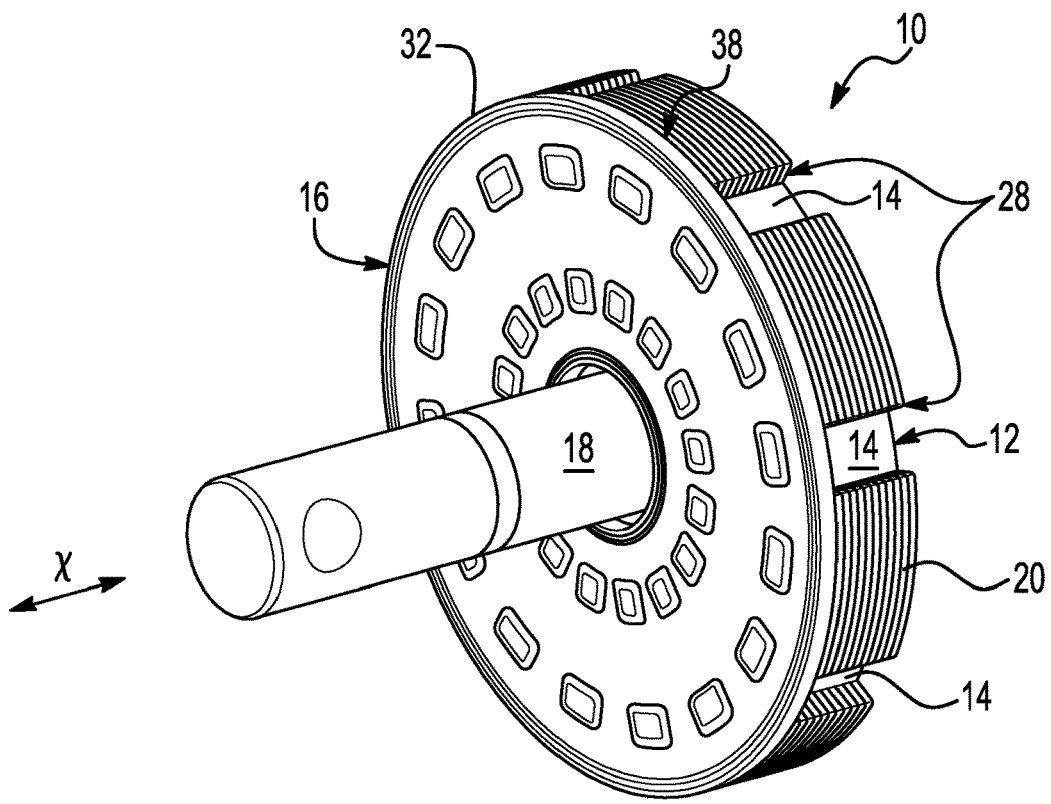
FIG. 1 is a perspective view depicting an implementation of a rotor assembly.

Electric motors include a stator having a plurality of stator windings and a rotor assembly. More specifically, electric machines or electric motors can include a rotor assembly having permanent magnets that are radially spaced about the assembly. As electrical current is supplied in a controlled manner to the stator windings, the rotor can be induced to move angularly relative to the stator. The rotor assembly can include a rotor having a hub with radially-extending rotor arms that define rotor slots between adjacent arms. Permanent magnets can be secured in the rotor slots by mechanically deforming the arms in a way that secures the magnets within the slots. Ideally, the thickness of the arms at the base—the point where the arms begin to extend radially-outwardly from the hub—would be minimized as increased thickness can be inversely related to magnetic flux performance of the rotor assembly. However, an increased thickness of the arms at the base can help make the rotor assembly more robust. In some applications, making the base of the arms sufficiently narrow to meet magnetic performance goals may not also secure the permanent magnets within the rotor slots thereby permitting the magnets to move axially and interfere with the stator or causing the rotor slots to break under centrifugal loads or impact loads.

It is possible to minimize the base thickness of the arms of the rotor while robustly securing the permanent magnets within the rotor. A rotor plate can join or bond with a radial face of the rotor used in an electrical machine or electric motor and strengthen the rotor assembly while also minimizing the base thickness of the rotor arms. The proper amount of adhesive is important. Too much may add cost, increase risk of cured adhesive contacting undesirable surfaces, such as the stator or housing, or provide too weak a bond between the rotor plate and the rotor. Too little adhesive and the magnets may not be secured properly in the rotor or the joint may not accommodate thermal expansion differences between the rotor and the rotor plate. The rotor and rotor arms can be formed from a plurality of stacked steel sheets that are laminated together. After the rotor and rotor arms are formed, they can be bonded to the rotor plate. The rotor plate can be relatively planar having an outer radius and an inner radius. An outer raised lip can be formed along the outer radius of the rotor plate that extends axially away from a radial face of the rotor plate. It is also possible to form an inner raised lip along the inner radius of the rotor plate that extends axially away from the radial face of the rotor plate in the same direction as the outer raised lip. The raised lip is advantageous for containing a bonding material while it is in a fluid state. A plurality of rotor pads can extend radially outwardly from the radial face of the rotor plate and are configured to engage a radial face of the rotor and also control the distance between the rotor and rotor plate thereby defining a thickness and an amount of adhesive that joins the rotor to the rotor plate. Apart from controlling the adhesive amount, the rotor pads can be used to control the axial position of the permanent magnets within the rotor assembly. An orienting feature may be included if the rotor pads are to be aligned with the magnets.

The rotor plate with these features can facilitate bonding with the rotor to form the rotor assembly such that the rotor plate can be laid flat with the rotor pads extending upwards. An initial amount of adhesive may be applied directly to the rotor. The rotor, along with the permanent magnets, can be placed on the rotor pads such that the radial face of the rotor rests on the pads. An adhesive, such as epoxy, can then be applied to an opposite radial face of the rotor so that the adhesive flows down through the rotor slots between the rotor and the permanent magnets toward the rotor plate and pool between the radial face of the rotor plate and the radial face of the rotor. The outer raised lip and, optionally, the inner raised lip, can help contain the escape of adhesive to minimize the amount of waste and mess.

Figure 2:
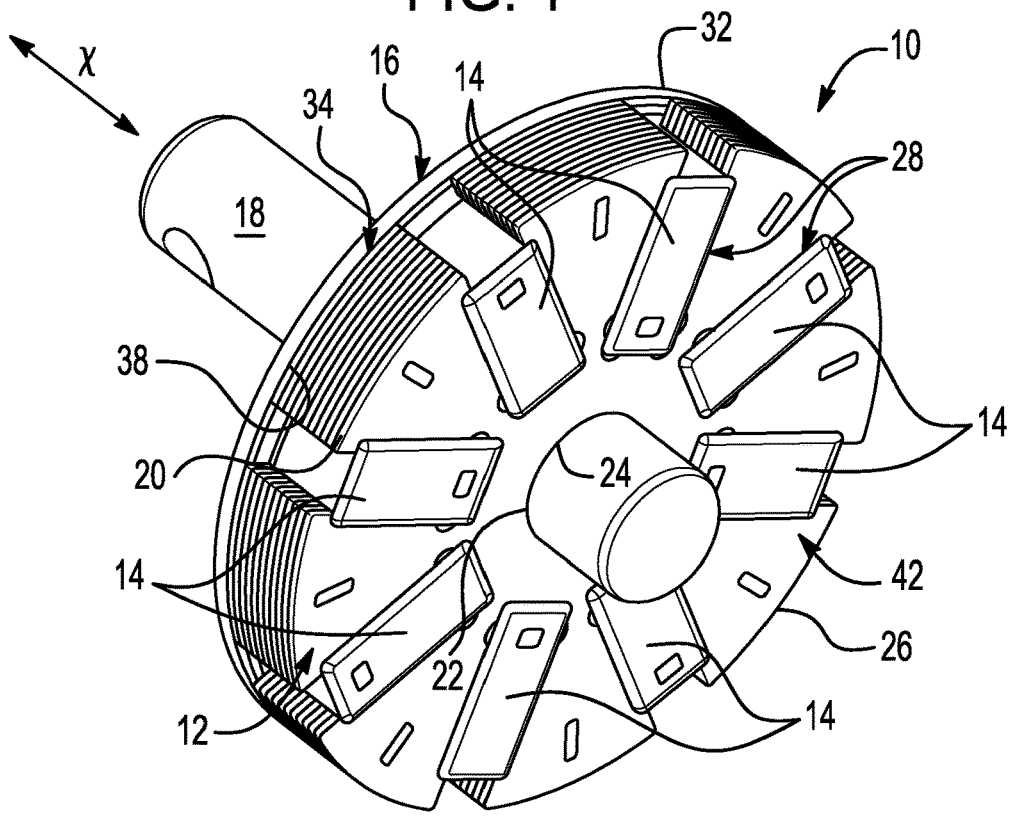
FIG. 2 is another perspective view depicting an implementation of a rotor assembly.
Figure 3:
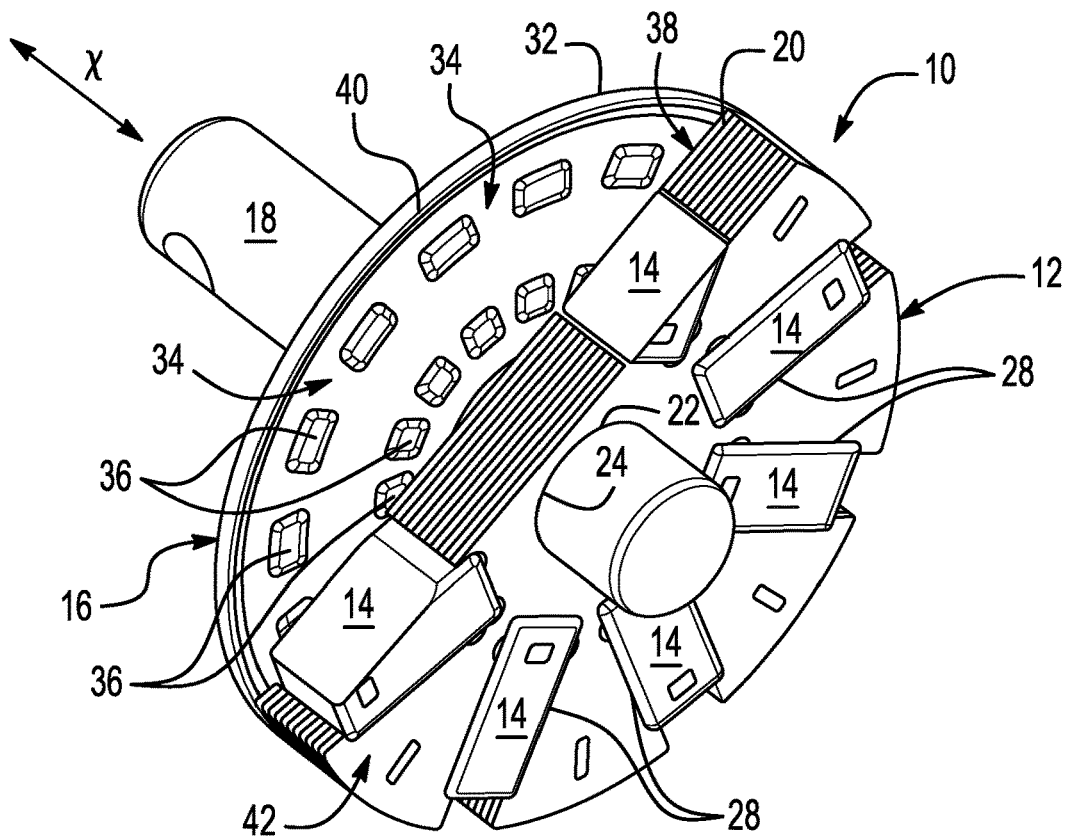
FIG. 3 is a perspective cross-sectional view depicting an implementation of a rotor assembly.

Turning to FIGS. 1-3, a rotor assembly 10 is shown including a rotor 12, permanent magnets 14, a rotor plate 16, and a motor shaft 18. In one implementation, the rotor 12 can be formed from a plurality of lamination sheets 20 stacked on top of each other in an axial direction along an axis of motor shaft rotation (x) and bonded together to form a unitary structure. Each lamination sheet 20 can have an inner diameter 22 with a size that closely matches an outer diameter 24 of a motor shaft 18. An outer diameter 26 of the lamination sheets 20 can be chosen based on the size of a stator (not shown) that will receive the rotor assembly 10. The sheets 20 can be shaped to accommodate rotor slots 28 that each receive a permanent magnet 14 and can maintain the axial position of the magnet 14. As the sheets 20 are stacked on top of each other in the axial direction along the axis of motor rotation (x), they can be adhered together to form the rotor 12.

Figure 4:
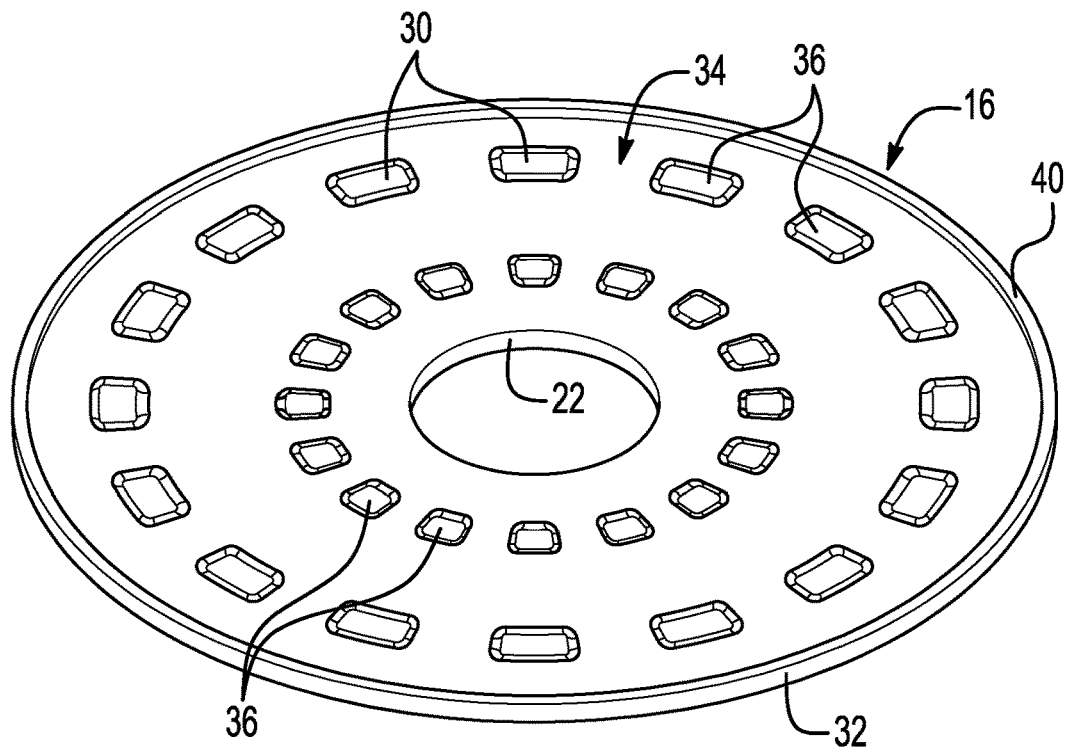
FIG. 4 is a perspective view depicting an implementation of a rotor plate.

The plurality of permanent magnets 14 can be axially moved into position within the rotor slots 28 of the rotor 12. The rotor slots 28 can be sized and shaped so that they form a close frictional fit with the permanent magnets 14, at least close enough to hold the magnets 14 in place during the assembly process. The rotor plate 16, shown in FIG. 4, can have an outer diameter 32 that closely matches or is slightly larger than the outer diameter 26 of the sheets 20 and the rotor 12, or for more internally located magnets, an outer diameter that contacts all of the magnets. Along one radial face 34 of the rotor plate 16, a plurality of rotor pads 36 can extend axially away from the plate 16. The rotor pads 36 can be spaced apart and positioned along the rotor plate 16 in locations such that, regardless of the relative angular position of the rotor 12 relative to the rotor plate 16, the pads will contact a radial face 38 of the rotor 12. The size or length of the rotor pads 36 can be selected to define an axial spatial relationship of the rotor 12, or the permanent magnets 14, relative to the rotor plate 16. In another implementation, the rotor pads may be aligned to contact the magnets or the rotor and an independent alignment feature may be added to facilitate assembly. An outer raised lip 40 can be formed along the circumference of the rotor plate 16 and extend in an axial direction relative to the axis (x) of motor shaft rotation. The outer raised lip 40 can be sized so that it defines an axial spacing between the rotor 12 and the rotor plate 16 and also, along with pad size, control the axial spacing of the permanent magnets 14 within the rotor 12. The rotor plate 16 can be made from a material having a coefficient of thermal expansion (CTE) similar to steel. A ferrous rotor plate may not be desirable because it can reduce magnetic performance and increase iron losses in the rotor. For example, the rotor plate 16 could be formed from a glass-filled plastic or another plastic material. The use of certain metals may not perform well due to an elevated or incompatible CTE.

As part of assembly of the rotor 12 with the rotor plate 16, the plate 16 can be oriented on its side so that the rotor pads 36 and outer lip 40 are facing upwards. The rotor 12 can then be placed on top of the rotor pads 36 so that the radial face 38 of the rotor contacts the pads 36. An adhesive, such as epoxy, can then be applied to an opposite radial face 42 of the rotor 12 so that the adhesive flows downwards through the permanent magnets 14 and slots 28 to the rotor plate 16 below. The outer lip 40 can help contain the adhesive in between the radial face 38 of the rotor 12 and the rotor plate 16 thereby preventing the escape of excess adhesive material. The adhesive, as it begins its travel downward from the opposite radial face 42 of the rotor 12, can initially exist in a less viscous state and flow readily through the rotor slots 28 and magnets 14 but as it moves through the assembly 10 to the radial face 38, the adhesive can cool and become more viscous slowing its flow. The motor shaft 18 of the electric motor can be press fit within the inner diameter 22 of the plates 20 and rotor 12 and the rotor assembly 10 can be included in the electric motor.

The rotor assembly 10 can be used with electric motors in a variety of environments and applications. In one implementation, the rotor assembly 10 can be included in an electric motor used to control a camshaft phaser. The camshaft phaser can control the angular position of a camshaft relative to an angular position of a crankshaft of an internal combustion engine. The electric motor can regulate the phase of the camshaft relative to the crankshaft by driving a mechanical gearbox of the camshaft phaser via an output shaft of the electric motor according to a received motor control signal. The electric motor can be used with a variety of different cam phasers where the electric motor is rotating in order to maintain phase, such as the split-ring gear planetary cam phaser described in U.S. Patent Application Publication No. 2015/0315939, the contents of which are incorporated by reference.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A rotor assembly used in an electric motor, comprising:
   a rotor having an inner diameter, an outer diameter, and a plurality of rotor slots;
   a plurality of permanent magnets received within the rotor slots; and
   a rotor plate having an inner diameter, an outer diameter, an outer lip extending away from a radial face of the rotor plate toward the rotor, and a plurality of rotor pads on the radial face of the rotor plate that contact the rotor, wherein an adhesive bonds the rotor plate to a radial face of the rotor.

2. The rotor assembly recited in claim 1, wherein the plurality of rotor pads selectively contact the permanent magnets and the rotor.

3. The rotor assembly recited in claim 1, wherein the plurality of rotor pads contact all of the permanent magnets and the rotor.

4. The rotor assembly recited in claim 1, wherein the plurality of rotor pads contact all of the permanent magnets regardless of angular position of the rotor relative to the rotor plate.

5. The rotor assembly recited in claim 1, wherein the rotor comprises a plurality of lamination sheets.

6. The rotor assembly recited in claim 1, further comprising an electric motor coupled to a camshaft phaser.

7. The rotor assembly recited in claim 1, further comprising a motor shaft press-fit into the rotor.

8. The rotor assembly recited in claim 1, wherein the rotor permits slight axial movement of the permanent magnets before application of adhesive that bonds the rotor plate to the rotor.

9. The rotor assembly recited in claim 1, wherein the rotor assembly consists of one rotor plate.

10. The rotor assembly recited in claim 1, wherein the rotor plate is a glass-filled plastic.

\* \* \* \* \*